(12) United States Patent
Matsunaga

(10) Patent No.: US 10,967,857 B2
(45) Date of Patent: Apr. 6, 2021

(54) DRIVING SUPPORT DEVICE AND DRIVING SUPPORT METHOD

(71) Applicant: DENSO CORPORATION, Kariya (JP)

(72) Inventor: Shogo Matsunaga, Kariya (JP)

(73) Assignee: DENSO CORPORATION, Kariya (JP)

(*) Notice: Subject to any disclaimer, the term of this patent is extended or adjusted under 35 U.S.C. 154(b) by 467 days.

(21) Appl. No.: 16/065,467

(22) PCT Filed: Dec. 22, 2016

(86) PCT No.: PCT/JP2016/088532
§ 371 (c)(1),
(2) Date: Jun. 22, 2018

(87) PCT Pub. No.: WO2017/111110
PCT Pub. Date: Jun. 29, 2017

(65) Prior Publication Data
US 2019/0001973 A1    Jan. 3, 2019

(30) Foreign Application Priority Data

Dec. 25, 2015   (JP) .............................. JP2015-254445

(51) Int. Cl.
*G08G 1/16* (2006.01)
*B60W 30/095* (2012.01)
(Continued)

(52) U.S. Cl.
CPC ........... *B60W 30/0956* (2013.01); *B60T 7/12* (2013.01); *B60W 30/095* (2013.01); *G08G 1/16* (2013.01);
(Continued)

(58) Field of Classification Search
CPC combination set(s) only.
See application file for complete search history.

(56) References Cited

U.S. PATENT DOCUMENTS

| 10,824,155 B2* | 11/2020 | Hong .................... G08G 1/163 |
| 2008/0243389 A1* | 10/2008 | Inoue .................... G08G 1/165 |
| | | 701/301 |

(Continued)

FOREIGN PATENT DOCUMENTS

| JP | 2008-242544 A | 10/2008 |
| JP | 2011-118753 A | 6/2011 |

(Continued)

*Primary Examiner* — Jonathan M Dager
(74) *Attorney, Agent, or Firm* — Maschoff Brennan

(57) ABSTRACT

In a driving support device for a vehicle, a collision prediction unit uses a determination plane defined by a lateral position axis indicating a position with respect to a vehicle in a lateral direction orthogonal to a vehicle traveling direction, and a prediction time period axis indicating a time-to-collision set in the vehicle traveling direction. Specifically, the collision prediction unit establishes a first collision prediction area as an area in the determination plane. The collision prediction unit determines whether an object is present in the first collision prediction area. Based on this determination, the collision prediction unit predicts a collision between the vehicle and the object. The width of the first collision prediction area along the lateral position axis is set based on the width of the vehicle. The lateral position of the first collision prediction area is set based on the speed of the object and the time-to-collision.

15 Claims, 6 Drawing Sheets

(51) Int. Cl.
*B60T 7/12* (2006.01)
*B60R 21/34* (2011.01)
*B60W 10/18* (2012.01)

(52) U.S. Cl.
CPC .............. *B60R 21/34* (2013.01); *B60W 10/18* (2013.01); *B60W 2420/42* (2013.01); *B60W 2420/52* (2013.01)

(56) References Cited

U.S. PATENT DOCUMENTS

| | | | | |
|---|---|---|---|---|
| 2011/0133915 | A1* | 6/2011 | Ito | B60Q 1/525 340/435 |
| 2014/0288816 | A1* | 9/2014 | Hayasaka | B60W 10/18 701/301 |
| 2015/0307093 | A1* | 10/2015 | Sasabuchi | B60W 10/20 701/1 |
| 2016/0061172 | A1* | 3/2016 | Sato | B60W 30/16 701/112 |
| 2016/0368492 | A1* | 12/2016 | Al-Stouhi | G08G 1/162 |
| 2017/0301238 | A1* | 10/2017 | Brandriff | B60R 1/00 |
| 2018/0370529 | A1* | 12/2018 | Matsunaga | B60W 30/095 |
| 2019/0005821 | A1* | 1/2019 | Matsunaga | B60W 10/18 |
| 2019/0012919 | A1* | 1/2019 | Brandriff | G08G 1/167 |
| 2019/0034742 | A1* | 1/2019 | Gokan | B60T 7/12 |
| 2019/0071074 | A1* | 3/2019 | Gokan | G06K 9/00805 |
| 2019/0096255 | A1* | 3/2019 | Mills | G01S 17/00 |

FOREIGN PATENT DOCUMENTS

| | | |
|---|---|---|
| JP | 2012-48460 A | 3/2012 |
| JP | 2015-032028 | 2/2015 |
| JP | 2017-117344 | 6/2017 |

\* cited by examiner

DRIVING SUPPORT DEVICE AND DRIVING SUPPORT METHOD

CROSS-REFERENCE TO RELATED APPLICATION

This patent application is based on Japanese Patent Application No. 2015-254445 filed Dec. 25, 2015 in the Japan Patent Office, the entire disclosure of which is incorporated herein by reference.

BACKGROUND

Technical Field

The present disclosure relates to a driving support device that is mounted to a vehicle to detect an object ahead of the vehicle and causes the vehicle to perform driving support, and a driving support method.

Background Art

In recent years, with the advancement of sensors and data processing, vehicles have been equipped with a driving support device to avoid collision accidents caused by the entry of an object from the lateral direction into the traveling direction of the vehicle. For example, PTL 1 describes a driving support device that increases a detection area to detect an object when the lateral movement speed of the object approaching the vehicle from lateral direction with respect to the traveling direction of the vehicle is equal to or higher than a predetermined speed and when the distance between the object and the vehicle is equal to or shorter than a predetermined distance. The detection area is within a range in which both a camera and a radar can detect the object, which makes it possible to detect the laterally moving object with high accuracy.

CITATION LIST

Patent Literature

[PTL 1] JP 2012-48460 A

As described above, the driving support device described in PTL 1 increases the detection area according to the distance and speed of an object when the object is laterally approaching to the traveling direction of the vehicle, to thereby detect the object laterally approaching the moving direction of the vehicle. However, the driving support device also increases the detection area when an object crosses the traveling direction of the vehicle without contacting the vehicle or when the vehicle passes across the moving direction of the object before the entry of the object into the traveling direction of the vehicle (the two situations will be collectively called "pass (passing) by"), which may cause unnecessary driving support, such as alarm generation or automatic braking, to be performed.

SUMMARY

A major objective of the present disclosure is to provide a driving support device and a driving support method that can prevent unnecessary driving support, when an object does not collide with the vehicle due to the passing by.

A first aspect of the present disclosure is a driving support device including: an object detection unit that detects an object moving in a direction crossing the traveling direction of a vehicle; a collision prediction unit that predicts a collision between the object detected by the object detection unit and the vehicle; a support execution unit that, when the collision prediction unit predicts a collision between the object and the vehicle, causes the vehicle to perform driving support for preventing the collision; a speed calculation unit that calculates the speed of the object; and a time-to-collision calculation unit that calculates a time-to-collision as a prediction time until the occurrence of a collision between the object and the vehicle based on information about the object detected by the object detection unit. The collision prediction unit establishes a first collision prediction area as an area in a determination plane defined by a lateral position axis indicating a lateral position with respect to the vehicle in a lateral direction orthogonal to the traveling direction of the vehicle and a prediction time axis indicating the time-to-collision set in the traveling direction of the vehicle. The collision prediction unit predicts a collision with the object depending on whether the object is present in the first collision prediction area in the determination plane. The width of the first collision prediction area along the lateral position axis is set based on the width of the vehicle. The lateral position of the first collision prediction area is set based on the speed of the object calculated by the speed calculation unit and the time-to-collision.

The collision prediction unit establishes the first collision prediction area, based on the lateral position that is the position of an object relative to the vehicle in the lateral direction orthogonal to the traveling direction of the vehicle, and the time-to-collision. Then, the collision prediction unit predicts a collision with the object depending on whether the object is present in the first collision prediction area. The width of the first collision prediction area along the lateral position axis direction is set based on the width of the vehicle. Accordingly, an object at a position exceeding the width along the lateral position axis, can be determined to be unlikely to collide with the vehicle. In addition, setting the lateral position of the first collision prediction area based on the speed of an object and the time-to-collision makes it possible to predict with high accuracy whether the object moving at the current speed is likely to collide with the vehicle. Accordingly, when an object is outside the first collision prediction area, it is determined that the object will pass by the vehicle without a collision, thereby preventing unnecessary driving support from being given.

BRIEF DESCRIPTION OF THE DRAWINGS

The above and other objects, features, and advantageous effects of the present disclosure will become clearer from the following detailed description with reference to the accompanying drawings. In the drawings.

DESCRIPTION OF PREFERRED EMBODIMENTS

The driving support device according to the present embodiment is mounted to a vehicle (the own vehicle) to detect an object around the own vehicle, such as ahead of the own vehicle in the traveling direction, and perform driving support control. The driving support control serves as a PCS system (pre-crash safety system) to avoid a collision with an object or reduce collision damage.

Figure 1:
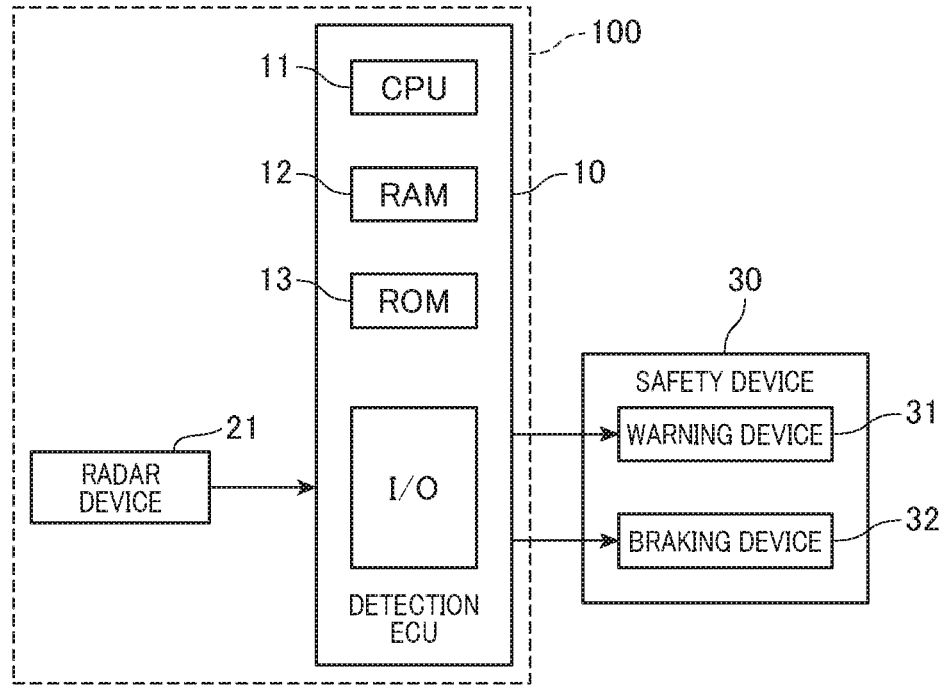
FIG. 1 is a set of block diagrams, in which (a) part thereof illustrates a block diagram of a hardware of a driving support device, and (b) part thereof illustrates a functional block diagram of a detection ECU, according to the present embodiment.
Figure 1:
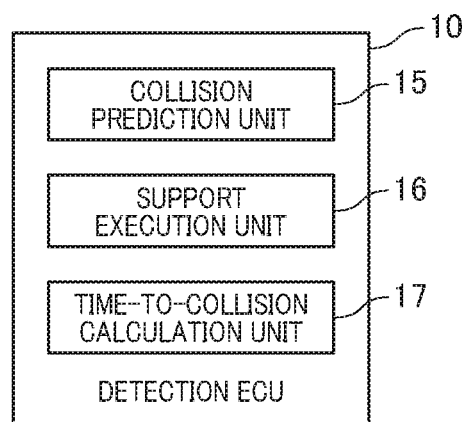

As shown in part (a) of FIG. 1, a driving support device 100 includes a detection ECU (electronic control unit) 10 and a radar device 21.

The radar device 21 is a publicly known millimeter wave radar, for example, that uses a high frequency signal in the millimeter waveband as transmission waves. The radar device 21 is disposed at the front end part of the own vehicle to detect the position of an object in an area at a predetermined detection angle as an object-detectable range. Specifically, the radar device 21 transmits search waves at predetermined intervals and receives reflection waves with a plurality of antennas. The radar device 21 calculates the distance to the object, based on the transmission time of the search waves and the reception time of the reflection waves. The radar device 21 also calculates the relative speed of the object (specifically, the relative speed in the traveling direction of the vehicle) from the frequencies of the reflection waves from the object, varied due to the Doppler effect. In addition, the radar device 21 calculates the azimuth of the object from phase differences in reflection waves received by the plurality of antennas. When the position and azimuth of the object can be calculated, the position (lateral position) of the object relative to the own vehicle can be specified. Accordingly, the radar device 21 corresponds to the object detection unit and the speed calculation unit. The radar device 21 transmits the search waves, receives the reflection waves, and calculates the reflection position and the relative speed at predetermined intervals, and transmits the calculated reflection position and relative speed to the detection ECU 10. In this way, the radar device 21 detects a target object moving in the direction crossing the traveling direction of the own vehicle.

The radar device 21 is connected to the detection ECU 10. The detection ECU 10 is a computer including a CPU (Central Processing Unit) 11, a RAM (Random Access Memory) 12, a ROM (Read Only Memory) 13, and an I/O (Input/Output) 14, and others. The detection ECU 10 actualizes these functions by the CPU 11 executing a program installed on the ROM 13. In the present embodiment, the program installed in the ROM 13 is a control program to detect an object ahead of the own vehicle and perform a prescribed driving support process, based on the information on the object (the calculated position, relative speed, and others) detected by the radar device 21. The ROM 13 corresponds to a non-transitory computer readable recording medium. Besides the ROM 13, the recording medium includes computer-readable electronic media such as digital versatile disk read only memory (DVD-ROM), compact disc read only memory (CD-ROM), and hard disk. As illustrated in (b) part of FIG. 1, the detection ECU 10 performs various functions using a collision prediction unit 15, a support execution unit 16, and a time-to-collision calculation unit 17.

In the present embodiment, the driving support process corresponds to the warning process which notifies the driver of an object that may collide with the own vehicle, and the braking process which applies brakes to the own vehicle. Accordingly, the own vehicle is equipped with a warning device 31 and a braking device 32 as safety devices 30 that are driven by control commands from the detection ECU 10.

The warning device 31 includes a speaker and a display mounted to the interior of the own vehicle. When the detection ECU 10 determines that a time-to-collision (TTC) described later becomes shorter than a first predetermined time and the probability of a collision of the own vehicle with an object becomes high, the warning device 31 outputs a warning sound, a warning message, or the like according to a control command from the detection ECU 10 to notify the driver of the risk of a collision. Accordingly, the warning device 31 corresponds to the notification unit.

The braking device 32 is a device that serves as brakes for the own vehicle. When the detection ECU 10 determines that the time-to-collision described later becomes shorter than a second predetermined time set to be shorter than the first predetermined time and the probability of a collision of the own vehicle with an object becomes high, the braking device 32 is activated according to a control command from the detection ECU 10. Specifically, the braking device 32 enhances the braking force generated by the driver's brake operation (brake assist function) or automatically applies brakes if the driver does not perform brake operation (automatic braking function). Accordingly, the braking device 32 corresponds to the automatic braking unit.

Figure 2:
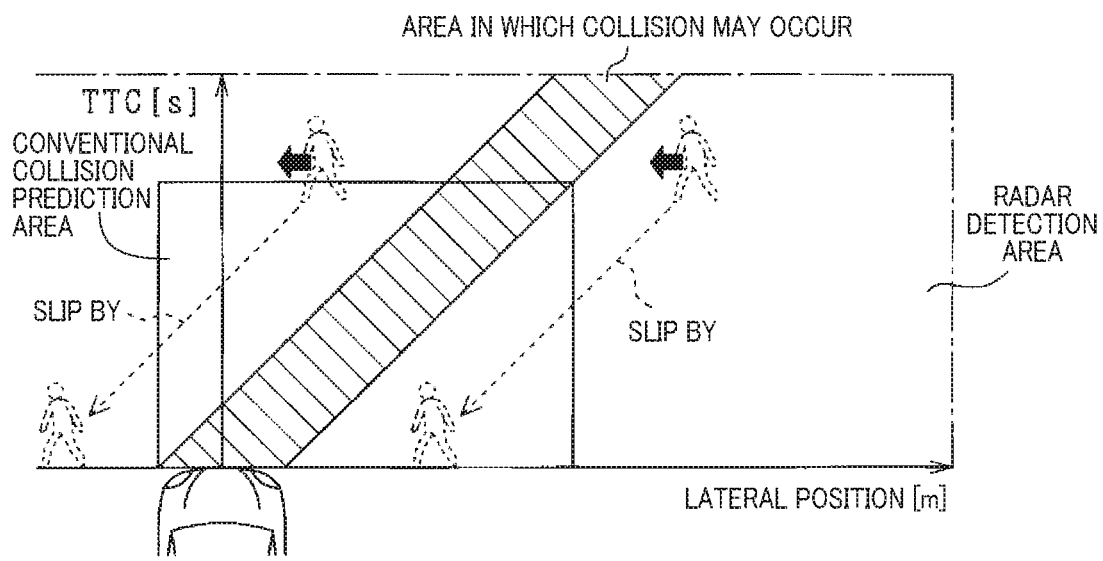
FIG. 2 is a diagram illustrating a problem that may occur under control of a conventional detection ECU.

The time-to-collision calculation unit 17 of the detection ECU 10 calculates a time-to-collision that is a time before the own vehicle collides with the object detected by the radar device 21. Specifically, the time-to-collision calculation unit 17 calculates a time-to-collision based on the distance and the speed of the object relative to the own vehicle. FIG. 2 establishes a radar detection area as an area where the radar device 21 can detect an object in a determination plane. The determination plane is defined by a longitudinal axis representing the time-to-collision (TTC), and a horizontal axis representing the lateral position of the object with respect to the own vehicle in the lateral direction orthogonal to the traveling direction of the own vehicle.

However, all objects in the radar detection area do not always have a risk of colliding with the own vehicle. Therefore, an object in a collision prediction area set to further limit the radar detection area is recognized as an object that might collide with the own vehicle. In the determination plane, the object is specified as a point (current position) by the lateral position and the time-to-collision. The conventional detection ECU determines an object within a collision prediction area established by setting thresholds for the lateral position and the time-to-collision as an object that may collide with the own vehicle, as illustrated in the rectangular frame of FIG. 2. As shown by the hatched area, the area having high probability of a collision with the own vehicle is narrower than the collision prediction area set by the conventional detection ECU. Accordingly, even when the object crosses the traveling direction of the own vehicle without contacting the own vehicle, or when the own vehicle passes across the moving direction of the object before the entry of the object into the traveling direction of the own vehicle, the object enters the collision prediction area and thus the driving support process may be performed although there will be no collision between the object and the own vehicle.

Accordingly, the collision prediction unit 15 of the detection ECU 10 of the present embodiment sets the lateral position of the collision prediction area based on the speed of the object in the radar detection area and the time-to-collision. In addition, the collision prediction unit 15 establishes a first collision prediction area and a third collision prediction area. Such collision predictions areas are established with consideration given to the fact that the conditions for determining whether to perform the driving support control are not always the same between the notification process performed by the warning device 31 and the automatic braking control performed by the braking device 32.

Figure 3:
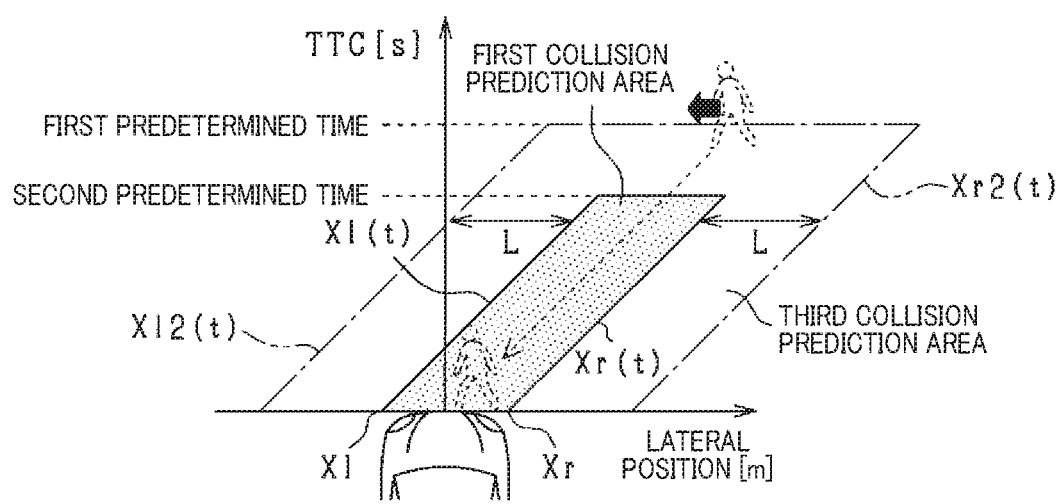
FIG. 3 is a diagram illustrating control performed by the detection ECU according to the present embodiment.

Specifically, as illustrated in FIG. 3, the collision prediction unit 15 establishes the first collision prediction area in which the width of the collision prediction area along the lateral axis is set to the width of the own vehicle, and sets the range of the first collision prediction area along the longitudinal axis from 0 to the second predetermined time. In this case, when the speed of the object along the lateral position axis (positive toward the right) at time t is designated as V(t) and the time-to-collision as TTC, right end Xr(t) and left end Xl(t) of the first collision prediction area are expressed by Equations (1) and (2). The own vehicle front right end Xr in the equation indicates the coordinate position of a point shifted rightward from the center of the own vehicle by half the vehicle width along the lateral position axis. The own vehicle front left end Xl in the equation indicates the coordinate position of a point shifted leftward from the center of the own vehicle by half the vehicle width along the lateral position axis. The collision prediction unit 15 takes the object in the established first collision prediction area as being likely to collide with the own vehicle and causes the braking device 32 to perform the automatic braking control.

$$Xr(t)=Xr-V(t) \times TTC \qquad (1)$$

$$Xl(t)=Xl-V(t) \times TTC \qquad (2)$$

In addition, the width of the first collision prediction area along the lateral axis (the lateral width of the first collision prediction area) is increased on both sides by a predetermined width L so as to establish the third collision prediction area in which the value ranges on the longitudinal axis are set from 0 to the first predetermined time. The lateral width of the first collision prediction area is increased on both sides by the predetermined width L as follows. Specifically, the predetermined width L is added to the own vehicle front right end Xr as expressed in Equation (3). At the same time, the predetermined width L is subtracted from the own vehicle front left end Xl, as expressed in Equation (4) to increase/correct the lateral width of the first collision prediction area. The collision prediction unit 15 takes the object in the third collision prediction area as being highly likely to collide with the own vehicle, or takes the object as being likely to change path in a direction of colliding with the own vehicle due to acceleration or deceleration of the own vehicle or the object. Accordingly, the collision prediction unit 15 determines whether to cause the warning device 31 to perform the notification process.

$$Xr2(t)=Xr+L-V(t) \times TTC \qquad (3)$$

$$Xl2(t)=Xl-L-V(t) \times TTC \qquad (4)$$

Figure 4:
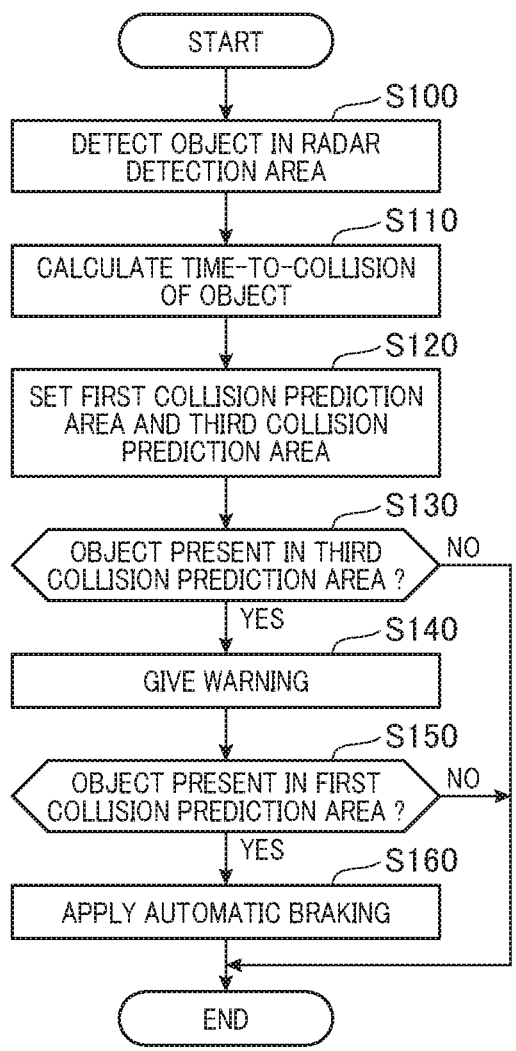
FIG. 4 is a flowchart of the control performed by the detection ECU according to the present embodiment.

In the present embodiment, the support execution unit 16 of the detection ECU 10 performs the driving support control described later with reference to FIG. 4. When the collision prediction unit 15 predicts that the object and the own vehicle will collide with each other, the support execution unit 16 causes the vehicle to perform the driving support to prevent the collision. The detection ECU 10 cyclically performs the driving support control described in FIG. 4 while the power supply for the detection ECU 10 is on.

First, in step S100, the detection ECU 10 causes the radar device 21 to detect an object in the radar detection area. Then, the detection ECU 10 causes the radar device 21 to calculate the relative position, relative distance, and relative speed of the object, and transmit the calculated information to the ECU 10. In this case, the relative position of the object is specified based on the position and azimuth of the object with respect to the own vehicle and corresponds to the lateral position of the object in the determination plane. The relative distance corresponds to the distance between the own vehicle and the object calculated based on the relative position. In step S110, the time-to-collision calculation unit 17 calculates the time-to-collision of the object from the relative speed and relative distance of the object acquired from the radar device 21. In step S120, the collision prediction unit 15 establishes the first collision prediction area and the third collision prediction area in the radar detection area, based on the information of the object acquired in steps S100 and S110.

Next, in step S130, the detection ECU 10 determines whether an object is present in the third collision prediction area among the two collision prediction areas established in step S120. Specifically, when the current position of the object (the lateral position and the time-to-collision) is within the third collision prediction area, the detection ECU 10 determines that the object is present in the third collision prediction area. When it is determined that the object is not present in the third collision prediction area (NO in S130), the detection ECU 10 terminates the control. When it is determined that the object is present in the third collision prediction area (YES in S130), the process proceeds to step S140 where the support execution unit 16 causes the warning device 31 to perform the notification process.

In step S150, the detection ECU 10 determines whether the object is present in the first collision prediction area. When it is determined that the object is not present in the first collision prediction area (NO in S150), the detection ECU 10 terminates the control. When the detection ECU 10 determines that the object is present in the first collision prediction area (YES in S150), the process proceeds to step S160 where the support execution unit 16 causes the braking device 32 to perform the automatic braking control, and then terminates the control.

According to the aforementioned configuration, the present embodiment provides the advantageous effects described below.

The width of the first collision prediction area along the lateral position axis is set based on the width of the own vehicle. This makes it possible to determine that an object at a position exceeding the width along the lateral position axis is unlikely to collide with the own vehicle. In addition, setting the lateral position of the first collision prediction area based on the speed of an object and the time-to-collision makes it possible to determine with high accuracy whether the object approaching at the current speed is likely to collide with the own vehicle. Accordingly, when an object is outside the first collision prediction area, it is determined that the object will pass by the own vehicle without a collision, thereby preventing the warning device 31 and the braking device 32 from erroneously performing control.

The lateral position of the first collision prediction area is indicated by straight lines with the speed of the object as slopes as expressed in Equations (1) and (2). Therefore, a virtual line of the right end Xr(t) of the first collision prediction area calculated from Equation (1) and a virtual line of the left end Xl(t) of the first collision prediction area calculated from Equation (2) can be drawn in the determination plane. These virtual lines are boundary lines in the case where the object running at the current speed collides with the own vehicle. Accordingly, establishing the first collision prediction area based on these virtual lines makes it possible to determine that an object passing by the own vehicle without a collision is outside the first collision prediction area. In addition, the value ranges of the first collision prediction area on the longitudinal axis are set from 0 to the second predetermined time. Thus, an object in the first collision prediction area is taken as being likely to collide with the own vehicle. Therefore, the braking device 32 is caused to perform the automatic braking control to avoid a collision between the object and the own vehicle.

The lateral width of the first collision prediction area is increased on both sides by the predetermined width L to establish the third collision prediction area in which the value ranges on the longitudinal axis are set from 0 to the first predetermined time. This allows the warning device 31 to perform the notification process for an object highly likely to collide with the own vehicle or likely to change the path in a direction of colliding with the own vehicle due to acceleration or deceleration of the own vehicle or the object. Accordingly, the driver is urged to decelerate the vehicle in preparation for a collision with the object.

The aforementioned embodiment may be modified as described below.

In the aforementioned embodiment, when an object is present in the first collision prediction area, the braking device 32 is caused to perform the automatic braking control. Additionally, when an object is present in the third collision prediction area, the warning device 31 is caused to perform the notification process. In this regard, the means for preventing a collision with an object is not limited to the warning device 31 and the braking device 32. For example, instead of the automatic braking control performed by the braking device 32, a steering wheel control unit may be provided to automatically control the steering wheel for avoidance of a collision with an object when an object is present in the first collision prediction area. In this case, the second predetermined time constituting the range of the first collision prediction area along the longitudinal axis is changed to a third predetermined time. The third predetermined time is set as a time necessary for safely avoiding a collision with an object by automatically controlling the steering wheel, for example.

In the aforementioned embodiment, the first and third collision prediction areas are established in the determination plane to determine whether to perform the driving support for an object in these collision prediction areas. In this regard, the third collision prediction area need not necessarily be established. When the third collision prediction area is not established, the range of the first collision prediction area along the longitudinal axis is increased to the first predetermined time. When an object enters the first collision prediction area with the time-to-collision ranging from the second predetermined time to the first predetermined time, the warning device 31 is caused to perform the notification process. When the object enters the first collision prediction area with the time-to-collision shorter than the second predetermined time, the braking device 32 is caused to perform the automatic braking control.

Figure 5:
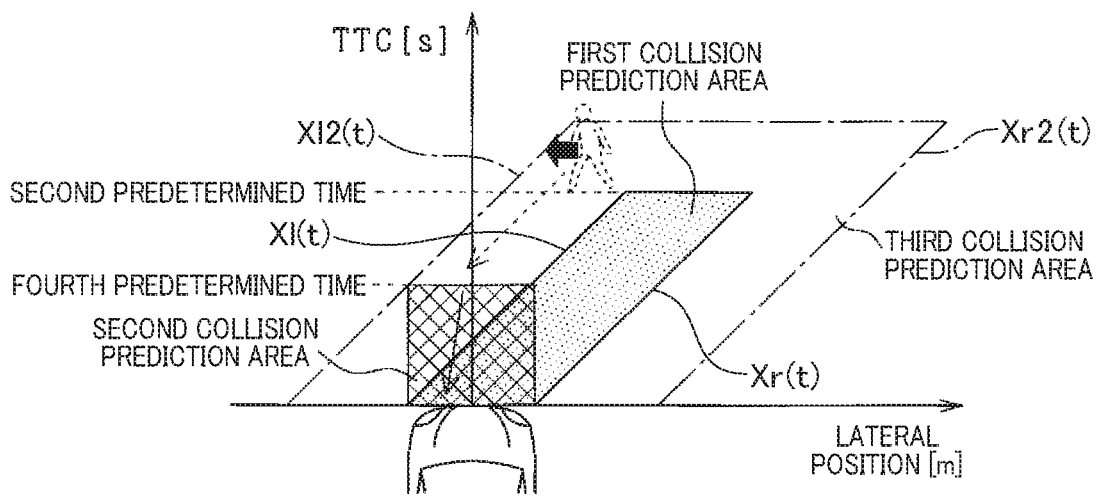
FIG. 5 is a diagram illustrating control performed by a detection ECU according to another example.

In the aforementioned embodiment, when it is determined that an object is present in the first collision prediction area, the braking device 32 is caused to perform the automatic braking control. Additionally, when it is determined that an object is outside the first collision prediction area, the braking device 32 is caused to not perform the automatic braking control because the object will pass by the own vehicle without a collision. In this regard, even though it is predicted that an object will pass by the own vehicle on the outside of the first collision prediction area, if the object and the own vehicle change their paths in a direction of colliding with each other due to acceleration or deceleration of the object or the own vehicle, there is a risk that the automatic braking control may be delayed in a short time-to-collision range. In view of this risk, as illustrated in FIG. 5, the collision prediction unit 15 establishes a second collision prediction area in which the value ranges on the longitudinal axis in the determination plane are set from 0 to a fourth predetermined time such that the lateral position is inside the width based on the vehicle width. The fourth predetermined time is set to be shorter than the second predetermined time. Therefore, an object entering the second collision prediction area is also taken as being likely to collide with the own vehicle, and thus the braking device 32 is caused to perform the automatic braking control. This may prevent delay of the automatic braking control performed by the braking device 32 and reduce the driver's uneasy feeling.

EXAMPLE 1

In the aforementioned embodiment, the radar device 21 detects an object. In this regard, the radar device 21 need not necessarily detect an object, but an imaging device, for example, may detect an object moving in the direction of crossing the traveling direction of the own vehicle. The imaging device includes, for example, a CCD camera, a CMOS image sensor, a monocular camera or a stereo camera using a near-infrared camera or the like. In this case as well, the imaging device can calculate the position information and relative speed of the object based on the captured image. Accordingly, this configuration provides the same advantageous effects as those of the aforementioned embodiment.

However, when the speed of an object is detected from the image captured by the imaging device, a large part of the image is occupied by objects near the own vehicle, and thus there is a risk that the speed of the object might be incorrectly calculated as being lower than actual one. In this case, it may be determined that the object is not in the first collision prediction area due to the error in the speed of the object, although the object is actually in the first collision prediction area.

Figure 6:
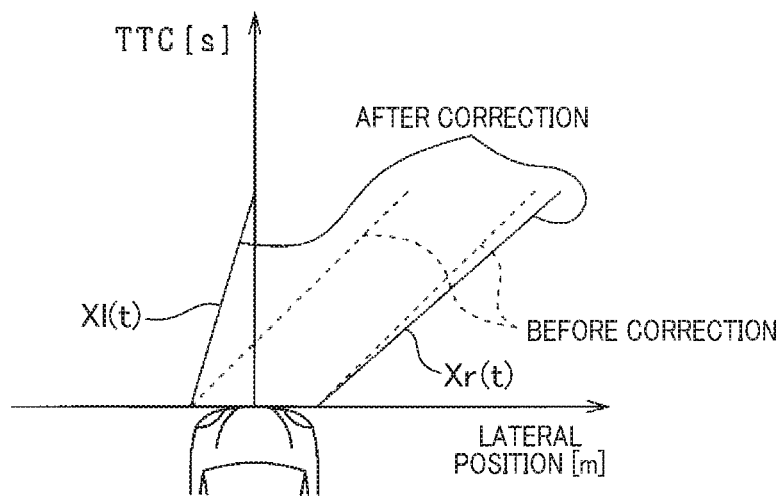
FIG. 6 is a diagram illustrating an example of correcting a collision prediction area.

Accordingly, when the distance of the object relative to the own vehicle is shorter than a first predetermined distance, the collision prediction area is corrected to be wider in the lateral direction as illustrated in FIG. 6, such that the straight line of the right end Xr(t) of the first collision prediction area has a shallow slope and the straight line of the left end Xl(t) of the first collision prediction area has a steep slope. Specifically, as expressed in Equation (5), the slope of the straight line of the right end Xr(t) of the first collision prediction area is corrected by multiplying the product of the speed of the object and the time-to-collision, by a value obtained by adding a first correction value α to 1. In addition, as expressed in Equation (6), the slope of the straight line of the left end Xl(t) of the first collision prediction area is corrected by multiplying the product of the speed of the object and the time-to-collision, by a value obtained by subtracting the first correction value α from 1. As illustrated in FIG. 7(a), the first correction value α is 0 when the relative distance is longer than the first predetermined distance, and tends to be larger than 0 as the relative distance becomes shorter than the first predetermined distance. This can bring the position of the object into the first collision prediction area even if an error has occurred in the speed of the object calculated using the image captured by the imaging device.

$$Xr(t)=Xr-V(t) \times TTC \times (1+\alpha) \quad (5)$$

$$Xl(t)=Xl-V(t) \times TTC \times (1-\alpha) \quad (6)$$

In Example 1, the slope of the straight line of the right end Xr(t) of the first collision prediction area and the slope of the straight line of the left end Xl(t) of the first collision prediction area are corrected. In this regard, both the slopes of the straight lines need not necessarily be corrected by using the first correction value α. For example, when correcting the slope of the straight line of the right end Xr(t) of the first collision prediction area, the first correction value α may be used to correct the first collision prediction area so as to be expanded in the lateral direction. The slope of the straight line of the left end Xl(t) of the first collision prediction area need not be corrected or may be corrected using a value different from the first correction value α.

In relation to Example 1, the method for correcting the first collision prediction area has been described. However, the correction method may be applied to the third collision prediction area.

EXAMPLE 2

Figure 7:
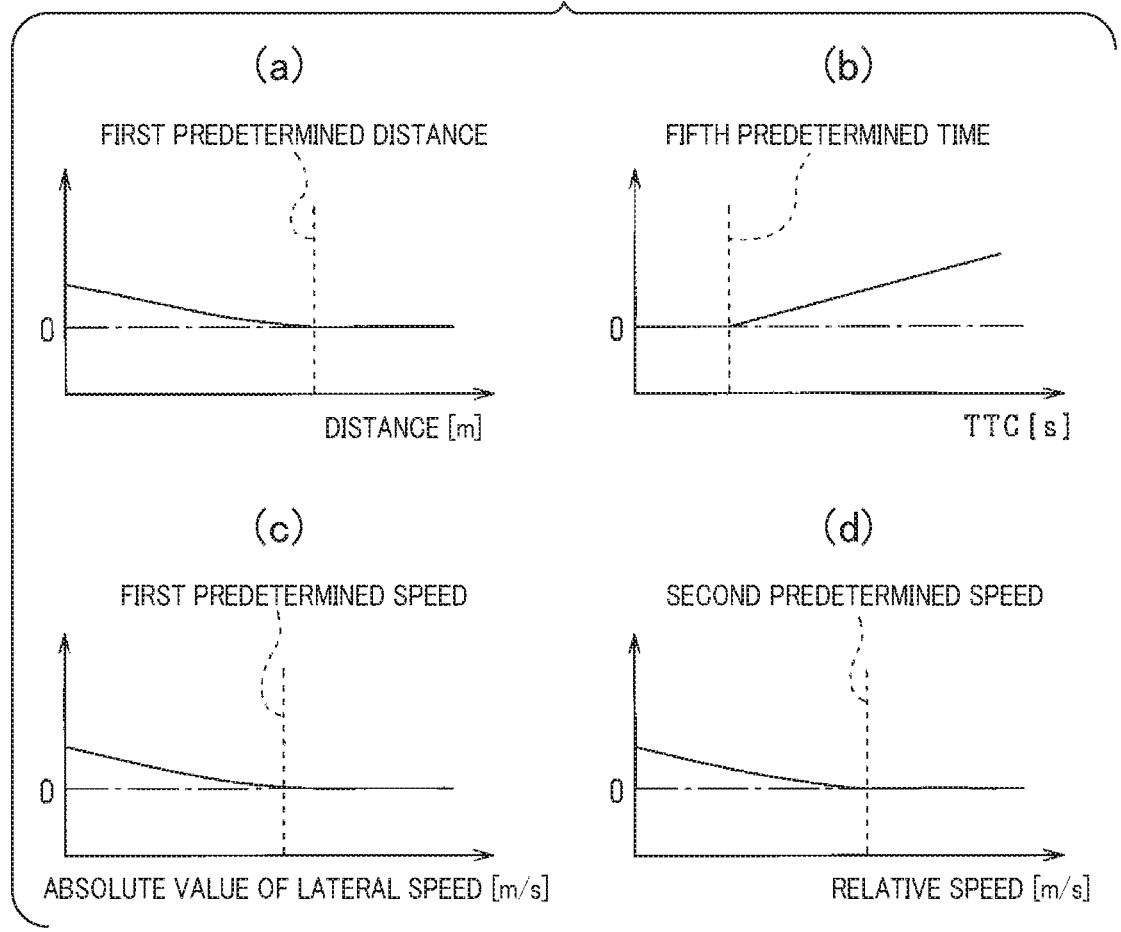
FIG. 7 is a set of graphs illustrating change tendencies of a correction value used in the correction of the collision prediction area.
Figure 8:
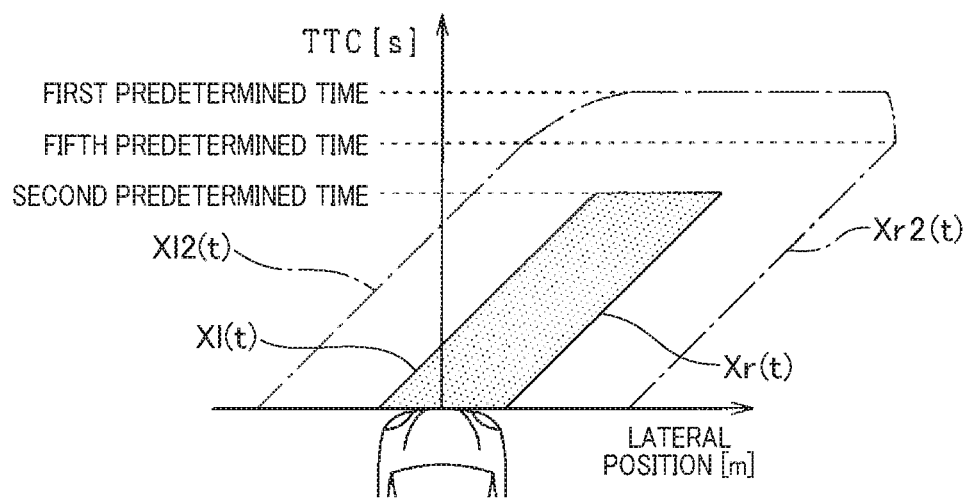
FIG. 8 is a diagram illustrating an example of correcting a collision prediction area.

In the aforementioned embodiment, the width of the third collision prediction area along the lateral axis is set by increasing the width of the first collision prediction area on both sides by the predetermined width L. In the third collision prediction area, in a range in which the time-to-collision is longer than a fifth predetermined time, the width of the third collision prediction area along the lateral axis is narrowed, as illustrated in FIG. 8, by correcting the slope of the straight line of right end Xr2(t) of the third collision prediction area to be smaller, and by correcting the slope of the straight line of left end Xl2(t) of the third collision prediction area to be larger. The fifth predetermined time is set to be longer than the second predetermined time and shorter than the first predetermined time. Specifically, as expressed in Equation (7), the slope of the straight line of the right end Xr2(t) of the third collision prediction area is corrected by multiplying the product of the speed of the object and the time-to-collision, by a value calculated by subtracting a second correction value β from 1. In addition, as expressed in Equation (8), the slope of the straight line of the left end Xl2(t) of the third collision prediction area is corrected by multiplying the product of the speed of the object and the time-to-collision, by a value calculated by adding the second correction value β to 1. As illustrated in FIG. 7(b), the second correction value β is 0 when the time-to-collision is shorter than the fifth predetermined time and tends to be larger than 0 as the time-to-collision becomes longer than the fifth predetermined time.

$$Xr2(t)=Xr-V(t) \times TTC \times (1-\beta) \quad (7)$$

$$Xl2(t)=Xl-V(t) \times TTC \times (1+\beta) \quad (8)$$

It is predicted that some time will be taken for the object detected in the range where the time-to-collision is longer than the fifth predetermined time to collide with the own vehicle, and the object or the own vehicle might accelerate or decelerate from this time forward. Therefore, even though the object and the own vehicle are currently on collision paths, these paths may change hereafter such that the object and the own vehicle will not collide with each other. Accordingly, the slopes of the straight lines are corrected according to Equations (7) and (8) to narrow the width of the third collision prediction area along the lateral axis so that only those objects which are highly likely to collide with the own vehicle are detected. This makes it possible to eliminate the need to determine whether to perform the driving support for the objects that will soon be outside the third collision prediction area due to acceleration or deceleration of the object or the own vehicle, thereby reducing the frequency of performing the driving support control.

In Example 2, the slope of the straight line of the right end Xr2(t) of the third collision prediction area and the slope of the straight line of the left end Xl2(t) of the third collision prediction area are corrected. In this regard, both the slopes of the straight lines need not be necessarily corrected by using the second correction value β. For example, when correcting the slope of the straight line of the right end Xr2(t) of the third collision prediction area, the second correction value β may be used to narrow the width of the third collision prediction area along the lateral axis. The slope of the straight line of the left end Xl2(t) of the third collision prediction area need not be necessarily corrected, or may be corrected using a value different from the second correction value β.

In relation to example 2, the method for correcting the third collision prediction area has been described. However, the aforementioned correction method may be applied to the first collision prediction area.

EXAMPLE 3

Figure 9:
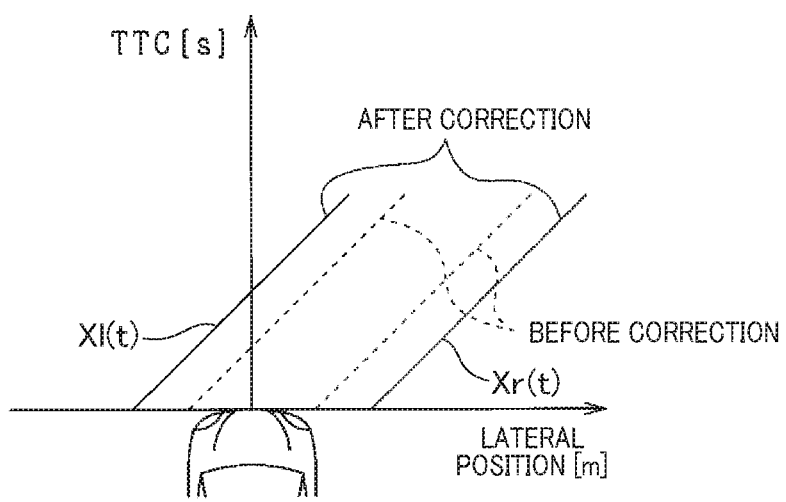
FIG. 9 is a diagram illustrating an example of correcting a collision prediction area.

In the aforementioned embodiment, the width of the first collision prediction area along the lateral axis is set to the width of the own vehicle. In this regard, when the speed of an object along the lateral position axis in the determination plane is lower than the first predetermined speed, in particular, when the object is a pedestrian, it is presumed that the speed of the object will frequently increase or decrease. In this case, even though it is predicted that the object will be outside the first collision prediction area and passes by the own vehicle, if the object changes path to a path of possible collision in the future with the own vehicle by accidental acceleration or deceleration of the object, there is a concern that the object might enter the first collision prediction area in the state where the time-to-collision is shorter than the second predetermined time. To prepare for such a situation, when the speed of the object is lower than the first predetermined speed, the collision prediction unit 15 corrects, as illustrated in FIG. 9, the lateral width of the first collision prediction area to increase the lateral width in both directions. Specifically, as expressed in Equations (9) and (10), the collision prediction unit 15 corrects the lateral width of the first collision prediction area by multiplying each of the own vehicle front right end Xr and the own vehicle front left end Xl by a first correction coefficient γ. As illustrated in FIG. 10(a), the first correction coefficient γ is 1 when the absolute value of the speed of the object is higher than the first predetermined speed, and tends to be larger than 1 as the absolute value of the speed of the object becomes lower than the first predetermined speed. Thus, a collision between the object and the own vehicle is predicted with high accuracy even in the situation where the behavior of the object is likely to change.

$$Xr(t)=Xr\times\gamma-V(t)\times TTC \qquad (9)$$

$$Xl(t)=Xl\times\gamma-V(t)\times TTC \qquad (10)$$

In Example 3, when the speed of the object is lower than the first predetermined speed, the collision prediction unit 15 may increase/correct the width of the first collision prediction area along the lateral position axis. At the same time, the collision prediction unit 15 corrects the slopes of the straight lines according to Equations (5) and (6) to increase the first collision prediction area in the lateral direction, thereby further increasing the first collision prediction area. A specific method for correcting the slopes of the straight lines will be described. According to Equation (5), the slope of the straight line of the right end Xr(t) of the first collision prediction area is corrected by multiplying the product of the speed of the object and the time-to-collision, by a value calculated by adding a third correction value Δ to 1. In addition, according to Equation (6), the slope of the straight line of the left end Xl(t) of the first collision prediction area is corrected by multiplying the product of the speed of the object and the time-to-collision, by a value calculated by subtracting the third correction value Δ from 1. As illustrated in FIG. 7(*c*), the third correction value Δ is 0 when the speed of the object is higher than the first predetermined speed, and tends to be larger than 0 as the speed of the object becomes lower than the first predetermined speed. Thus, a collision between the object and the own vehicle is more reliably predicted with high accuracy in the situation where the behavior of the object is likely to change.

In Example 3, when the speed of the object is lower than the first predetermined speed, the width of the first collision prediction area along the lateral position axis direction is increased/corrected. In this regard, instead of increasing/correcting the width of the first collision prediction area along the lateral position axis, the slopes of the straight lines may be corrected according to Equations (5) and (6) to increase the first collision prediction area in the lateral direction, to thereby increase the first collision prediction area.

Figure 10:
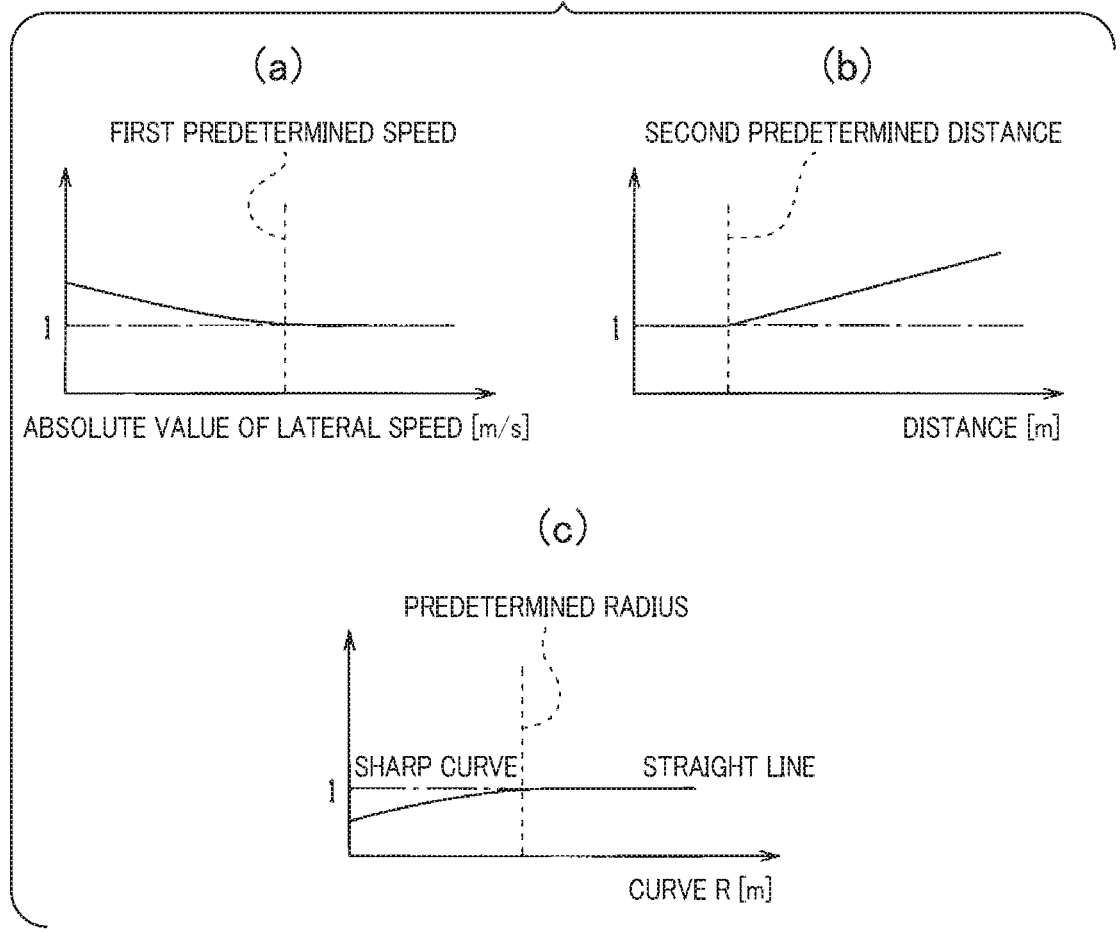
FIG. 10 is a set of graphs illustrating change tendencies of a correction coefficient used in the correction of the collision prediction area.

In Example 3, when the speed of the object is lower than the first predetermined speed, the width of the first collision prediction area along the lateral position axis direction is increased/corrected. In this regard, when the distance of the object relative to the own vehicle is longer than a second predetermined distance, the width of the first collision prediction area at the lateral position in the axis direction may be increased/corrected. Specifically, the lateral width of the first collision prediction area is corrected by multiplying each of the own vehicle front right end Xr and the own vehicle front left end Xl, by a second correction coefficient E, according to Equations (9) and (10). As illustrated in FIG. 10(*b*), the second correction coefficient ε is 1 when the relative distance is shorter than the second predetermined distance, and tends to be larger than 1 as the relative distance becomes longer than the second predetermined distance.

When the object and the own vehicle are distant from each other, the accuracy of the information about the object detected by the radar device 21 becomes low. Accordingly, the object may be detected as not being present in the first collision prediction area due to an error in the information about the object, although the object is actually present in the first collision prediction area. Therefore, when the distance of the object relative to the own vehicle is longer than the second predetermined distance, the width of the collision prediction area along the lateral position axis is increased/corrected. This makes it possible to detect that the object is in the increased and corrected first collision prediction area even if there is an error in the information about the object detected by the radar device 21.

In Example 3, when the speed of the object is lower than the first predetermined speed, the width of the first collision prediction area along the lateral position axis direction is increased/corrected. In this regard, when the speed of the object relative to the own vehicle is lower than a second predetermined speed, the slopes of the straight lines may be corrected according to Equations (5) and (6) to increase the collision prediction area in the lateral direction. Specifically, according to Equation (5), the slope of the straight line of the right end Xr(t) of the first collision prediction area is corrected by multiplying the product of the speed of the object and the time-to-collision, by a value calculated by adding a fourth correction value ζ to 1. In addition, according to Equation (6), the slope of the straight line of the left end Xl(t) of the first collision prediction area is corrected by multiplying the product of the speed of the object and the time-to-collision, by a value calculated by subtracting the fourth correction value ζ from 1. As illustrated in FIG. 7(*d*), the fourth correction value ζ is 0 when the relative speed is higher than the second predetermined speed, and tends to be larger than 0 as the relative speed becomes lower than the second predetermined speed.

When the relative speed between the object and the own vehicle is low, an error might occur in the time-to-collision. In this case, since the actual position of the object in the determination plane is shifted, the object may be detected as not being present in the first collision prediction area, although the object should be detected as being present in the first collision prediction area. The risk of the object being detected as not being present in the first collision prediction area is caused due to the error in the calculated time-to-collision. Therefore, when the speed of the object relative to the own vehicle is lower than the second predetermined speed, the slopes of the straight lines are corrected according to Equations (5) and (6) to increase the collision prediction area in the lateral direction. This makes it possible to detect that the object is within the increased/corrected first collision prediction area even if an error has occurred in the calculated time-to-collision in the situation where the relative speed of the object and the own vehicle is low.

Figure 11:
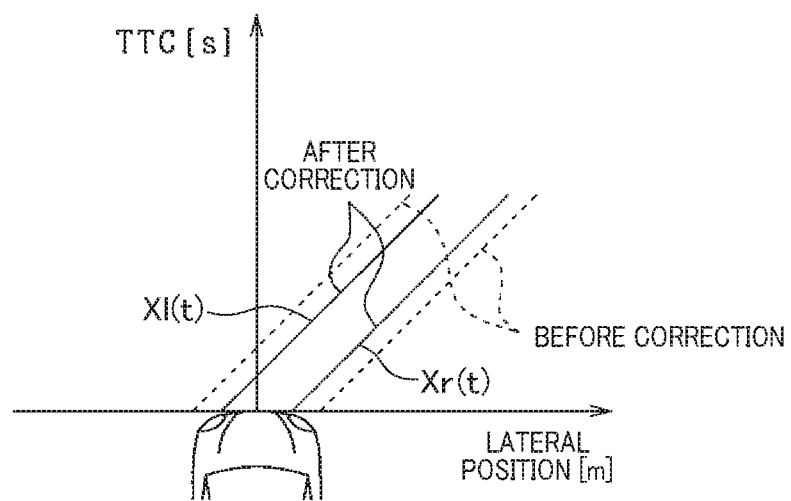
FIG. 11 is a diagram illustrating an example of correcting a collision prediction area.

In Example 3, when the speed of the object is lower than the first predetermined speed, the width of the first collision prediction area along the lateral position axis direction is increased/corrected. In this regard, when the driving support device 100 includes a means for detecting the turning angular speed of the own vehicle (for example, a yaw rate sensor), the width of the collision prediction area along the lateral position axis may be corrected according to the magnitude of the curvature radius (curve R) calculated based on the turning angular speed and the speed of the own vehicle. As illustrated in FIG. 11, when the curve R is smaller than a predetermined radius, the lateral width of the collision prediction area is corrected to decrease on both sides. Specifically, the lateral width of the collision prediction area is corrected according to Equations (9) and (10) by multiplying each of the own vehicle front right end Xr and the own vehicle front left end Xl, by a third correction coefficient η. As illustrated in FIG. 10(c), the third correction coefficient η is 1 when the curve R is larger than the predetermined radius, and tends to be larger than 1 as the curve R becomes smaller than the predetermined radius.

When the curve R is smaller than the predetermined radius, and the own vehicle is greatly turning with respect to the traveling direction of the own vehicle before the turning, the position of the own vehicle relative to the target object changes substantially. In this case, the collision prediction area cannot be properly developed, and thus the braking device 32 may be erroneously activated to perform the automatic braking control. Accordingly, when the curve R is smaller than the predetermined radius, decreasing and correcting the width of the collision prediction area along the lateral position axis can prevent erroneous execution of the automatic braking control by the braking device 32.

In Example 3 and another example applied to Example 3, the lateral width of the first collision prediction area is corrected by multiplying the own vehicle front right end Xr and the own vehicle front left end Xl, by the same correction coefficient. In this regard, the own vehicle front right end Xr and the own vehicle front left end Xl need not necessarily be multiplied by the same correction coefficient. For example, the own vehicle front right end Xr may be multiplied by a correction coefficient, while the own vehicle front left end Xl need not necessarily be multiplied by the correction coefficient, or may be multiplied by a correction coefficient different from the correction coefficient used to correct the own vehicle front right end Xr.

In another example applied to Example 3, the slope of the straight line of the right end Xr(t) of the first collision prediction area and the slope of the straight line of the left end Xl(t) of the first collision prediction area are corrected using the same correction value. In this regard, the slopes of the straight lines need not necessarily be corrected by using the same correction value. For example, when correcting the slope of the straight line of the right end Xr(t) of the first collision prediction area, the third correction value Δ or the fourth correction value ζ may be used to increase the first collision prediction area in the lateral direction. The slope of the straight line of the left end Xl(t) of the first collision prediction area need not necessarily be corrected, or may be corrected using a correction value different from the third correction value Δ or the fourth correction value ζ.

In relation to Example 3 and another example applied to Example 3, methods for correcting the first collision prediction area have been described. However, the same correction methods may be applied to the third collision prediction area.

The present disclosure has been described based on embodiments, however it should be understood that the present disclosure is not limited to these embodiments and configurations. The scope of the present disclosure should encompass various modifications or equivalents. Further, various combinations or modes, or other combinations or modes constituted by one or more elements of the various combinations or modes are included within the category or idea of the present disclosure.

PARTIAL REFERENCE SIGNS LIST

10 . . . Detection ECU
21 . . . Radar device

The invention claimed is:

1. A driving support device comprising:
an object detection unit that detects an object moving in a direction crossing the traveling direction of a vehicle;
a collision prediction unit configured to calculate a collision between the object detected by the object detection unit and the vehicle;
a support performing unit configured to cause the vehicle to perform driving support for preventing the collision, when the collision prediction unit predicts the collision between the object and the vehicle;
a speed calculation unit that calculates a speed of the object; and
a time-to-collision calculation unit configured to calculate a time-to-collision that is a prediction time period before the occurrence of a collision between the object and the vehicle, based on information about the object detected by the object detection unit, wherein
the collision prediction unit establishes a first collision prediction area as an area in a determination plane defined by a lateral position axis indicating a position with respect to the vehicle in a lateral direction orthogonal to the traveling direction of the vehicle, and a prediction time period axis indicating the time-to-collision set in the traveling direction of the vehicle, and predicts a collision with the object depending on whether the object is present in the first collision prediction area in the determination plane,
the first collision prediction area along the lateral position axis has a width that is set based on a width of the vehicle, and
the lateral position of the first collision prediction area is set based on a product calculated by multiplying a speed of the object in a direction of the lateral position axis by the time-to-collision.

2. The driving support device according to claim 1, wherein the collision prediction unit sets a current position of the object in the determination plane from a lateral position of the object detected by the object detection unit and the time-to-collision calculated by the time-to-collision calculation unit, and predicts a collision with the object when the current position is in the first collision prediction area.

3. The driving support device according to claim 1, wherein the lateral position of the first collision prediction area is set in the determination plane by straight lines indicating the speed of the object calculated, as slopes, in the direction of the lateral position axis by the speed calculation unit, the slopes having a tilt to the prediction time period axis.

4. The driving support device according to claim 3, wherein, when a speed of the object calculated by the speed calculation unit is lower than a predetermined speed, the collision prediction unit is configured to correct the slopes of the straight lines to increase the first collision prediction area in the direction of the lateral position axis depending on the prediction time period axis.

5. The driving support device according to claim 1, wherein, when a speed of the object calculated by the speed calculation unit is lower than a predetermined speed, the collision prediction unit increases and corrects a width of the first collision prediction area along the direction of the lateral position axis.

6. The driving support device according to claim 1, wherein the collision prediction unit establishes a second collision prediction area in the determination plane so as to be in a range where the time-to-collision is shorter than a predetermined time and the lateral position is inside a width based on a width of the vehicle, and predicts a collision with the object when the object is in the second collision prediction area in the determination plane.

7. The driving support device according to claim 1, wherein
the vehicle is provided with:
a notification unit that notifies a driver of an approach of the object; and
an automatic braking unit that applies automatic brakes to the vehicle, wherein
the collision prediction unit establishes a third collision prediction area in which a width of the first collision prediction area along the lateral position axis is increased on both sides by a predetermined width, and
the support performing unit sets an object in the first collision prediction area as a target of the automatic braking applied by the automatic braking unit and sets an object in the third collision prediction area as a target of the notification made by the notification unit.

8. A driving support method comprising:
an object detection step of detecting an object moving in a direction crossing the traveling direction of a vehicle;
a collision prediction step of predicting a collision between the object detected in the object detection step and the vehicle;
a support performing step of causing the vehicle to perform driving support for preventing a collision when the collision between the object and the vehicle is predicted in the collision prediction step;
a speed calculation step of calculating a speed of the object; and
a time-to-collision calculation step of calculating a time-to-collision that is a prediction time period before the occurrence of a collision between the object and the vehicle, based on information about the object detected in the object detection step, wherein:
in the collision prediction step, a first collision prediction area is established as an area in a determination plane defined by a lateral position axis indicating a position with respect to the vehicle in a lateral direction orthogonal to the traveling direction of the vehicle and a prediction time period axis indicating the time-to-collision set in the traveling direction of the vehicle, and a collision with the object is predicted depending on whether the object is present in the first collision prediction area in the determination plane, and
the first collision prediction area has a width along the lateral position axis that is set based on a width of the vehicle, and
the lateral position of the first collision prediction area is set based on a product calculated by multiplying a speed of the object in a direction of the lateral position axis by the time-to-collision.

9. The driving support method according to claim 8, wherein, in the collision prediction step, a current position of the object is set in the determination plane from a lateral position of the object detected in the object detection step and the time-to-collision calculated in the time-to-collision calculation step, and a collision with the object is predicted when the current position is in the first collision prediction area.

10. The driving support method according to claim 8, wherein, in the collision prediction step, a second collision prediction area is established in the determination plane so as to be in a range where the time-to-collision is shorter than a predetermined time and the lateral position is inside a width based on a width of the vehicle, and a collision with the object is predicted when the object is in the second collision prediction area in the determination plane.

11. The driving support method according to claim 8, wherein
the vehicle is provided with:
a notification step of notifying a driver of an approach of the object; and
an automatic braking step of applying an automatic brake to the vehicle, wherein
in the collision prediction step, a third collision prediction area is established such that a width of the first collision prediction area along the lateral position axis is increased on both sides by a predetermined width, and
in the support performing step, an object in the first collision prediction area is set as a target of the automatic braking applied in the automatic braking step and an object in the third collision prediction area is set as a target of the notification made in the notification step.

12. The driving support device according to claim 2, wherein the lateral position of the first collision prediction area is set in the determination plane by straight lines indicating the speed of the object calculated, as slopes, in the direction of the lateral position axis by the speed calculation unit, the slopes having a tilt to the prediction time period axis.

13. The driving support device according to claim 12, wherein, when a speed of the object calculated by the speed calculation unit is lower than a predetermined speed, the collision prediction unit is configured to correct the slopes of the straight lines to increase the first collision prediction area in the direction of the lateral position axis depending on the prediction time period axis.

14. The driving support device according to claim 2, wherein, when a speed of the object calculated by the speed calculation unit is lower than a predetermined speed, the collision prediction unit increases and corrects a width of the first collision prediction area along the direction of the lateral position axis.

15. The driving support device according to claim 2, wherein the collision prediction unit establishes a second collision prediction area in the determination plane so as to be in a range where the time-to-collision is shorter than a predetermined time and the lateral position is inside a width based on a width of the vehicle, and predicts a collision with the object when the object is in the second collision prediction area in the determination plane.

* * * * *